United States Patent

Hata

[11] Patent Number: 4,697,215
[45] Date of Patent: Sep. 29, 1987

[54] TAPE DRAW-OUT MECHANISM
[75] Inventor: Yujiro Hata, Tokyo, Japan
[73] Assignee: Fujitsu Limited, Kanagawa, Japan
[21] Appl. No.: 810,634
[22] Filed: Dec. 19, 1985
[30] Foreign Application Priority Data Dec. 21, 1984 [JP] Japan .................. 59-269893

[51] Int. Cl.$^4$ .......................... G11B 15/665
[52] U.S. Cl. ............................ 360/95; 360/85
[58] Field of Search .................. 360/84, 85, 95

[56] References Cited

U.S. PATENT DOCUMENTS 4,541,024 9/1985 Sieben .................. 360/95 X

*Primary Examiner*—John H. Wolff
*Attorney, Agent, or Firm*—Armstrong, Nikaido, Marmelstein & Kubovcik

[57] ABSTRACT

A tape draw-out mechanism comprises a tape draw-out member to be engaged with a tape between a pair of reels and tape draw-out member driving means for reciprocating the tape draw-out member between an initial position and a tape drawn-out position and driving the tape draw-out member so that the return time required for returning the tape draw-out member to the initial position from the tape drawn-out position is shorter than the time required for moving the tape draw-out member to the tape drawn-out position from the initial position. Drawing-out and return of the tape are performed by the reciprocating movement of the tape draw-out member.

15 Claims, 25 Drawing Figures

TAPE DRAW-OUT MECHANISM

BACKGROUND OF THE INVENTION

1. Field of the Invention

The present invention relates to a tape draw-out mechanism for drawing out a tape from a tape cartridge (cassette) such as a magnetic tape cartridge and forming a tape running path in which the tape is caused to abut against a stationary head. More particularly, the present invention relates to a tape draw-out mechanism for drawing out a tape by driving a tape draw-out member.

2. Description of the Related Art

A magnetic tape device is widely used for sound recording, picture recording, and data recording. In the magnetic tape device using a magnetic tape cartridge, especially a VTR tape cartridge, recording (writing) or reproduction (reading) is performed by drawing out a tape from the tape cartridge, forming a tape running path, and bringing the tape into contact with a stationary head. For this purpose, a tape draw-out mechanism is disposed.

The tape draw-out mechanism of the magnetic tape device known by the present inventors comprises a pair of tape draw-out members and motors for driving these members. When a tape cartridge is loaded on a driving mechanism of the magnetic tape device, a supply reel boss and wind reel boss driven by a reel motor are intruded in the reels of the tape cartridge, and tape rollers arranged on the top ends of arms constituting the tape draw-out members are intruded in the tape draw-out recesses of the tape cartridge. Then, the motors are rotated to turn the arms from an initial position to a drawn-out position, and by the engagement of the tape with the tape rollers on the top ends of the arms, the tape is drawn out from the tape cartridge and a tape running path for bringing the tape into contact with a stationary magnetic head and stationary guides is formed. After termination of recording/reproduction (reading/writing) by the stationary magnetic head, the motors are reversely rotated to return the arms to the initial position from the drawn-out position, whereby the tape is restored in the tape cartridge.

In this tape draw-out mechanism, the tape draw-out time necessary for the tape draw-out members to move from the initial position to the tape drawn-out position depends on the rotation speed of the arms, and this speed is set so that an excessive tension is not imposed on the tape when the tape is drawn out. The time required for the arms to move to the initial position from the tape drawn-out position is the same as the above time because the arms are reversely rotated at the same rotation speed as described above. Therefore, when the tape is to be rewound by a fast rewind operation, an excessive time elapses before the rewinding operation can be started after the termination of recording or reproduction. Especially in a magnetic tape device of the type where recording and reproduction are continuously and automatically carried out, the time required for handling one cartridge is prolonged and such wasted time accumulates and lowers the operation efficiency.

SUMMARY OF THE INVENTION

It is a primary object of the present invention to provide a tape draw-out mechanism in which the time required for the return operation is shortened.

In accordance with the present invention, this object is attained by a tape draw-out mechanism comprising a tape draw-out member to be engaged with a tape between a pair of reels and tape draw-out member driving means for reciprocating the tape draw-out member between the initial position and the tape drawn-out position and driving the tape draw-out member so that the return time required for returning the tape draw-out member to the initial position from the tape drawn-out position is shorter than the time required for moving the tape draw-out member to the tape drawn-out position from the initial position, wherein draw-out and return of the tape are performed by a reciprocating movement of the tape draw-out member.

According to the present invention, when the tape is drawn out, the moving speed of the tape draw-out member is restricted so that no excessive tension is imposed on the tape, but when the tape is returned, since the tension on the tape need not be taken into consideration, the moving speed of the tape draw-out member is increased to shorten the return time. For this purpose, driving means for reciprocating the tape draw-out member between the initial position and the tape drawn-out position is so constructed that the time required for return of the tape draw-out member is shorter than the time required for draw-out of the tape draw-out member.

DESCRIPTION OF THE PREFERRED EMBODIMENTS

Before describing the present invention, an explanation of related art used in the assignee's laboratory and known by the inventors when the invention was made will be given with reference to FIG. 20.

Figure 20:
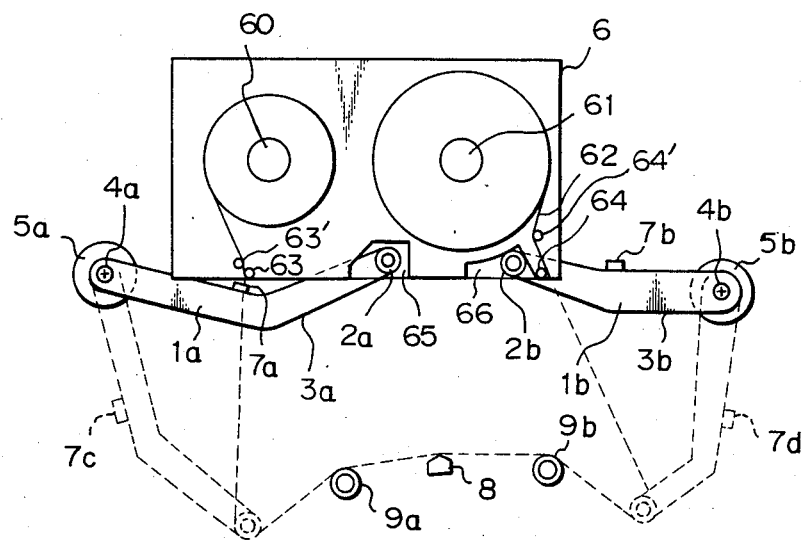
FIG. 20 is a diagram of the structure of a tape draw-out mechahism of the related art.

The tape draw-out mechanism of the magnetic tape device shown in FIG. 20 comprises a pair of tape draw-out members 3a and 3b and motors 5a and 5b for driving these members 3a and 3b. A magnetic tape cartridge (tape cassette) 6 comprises a pair of reels 60 and 61, a magnetic tape 62 moved between the reels 60 and 61, guides 63, 63' and 64, 64' for guiding the running of the magnetic tape, and recesses 65 and 66 formed for drawing out the tape. When this tape cartridge 6 is loaded on a driving mechanism of a magnetic tape device, supply reel boss and take-up reel boss driven by a reel motor (not shown) are intruded in the reels 60 and 61 of the tape cartridge 6, and tape rollers 2a and 2b arranged on the top ends of arms 1a and 1b constituting the tape draw-out members 3a and 3b are intruded in the tape draw-out recesses 65 and 66 of the tape cartridge 6. Then, the motors 5a and 5b are rotated to turn the arms 1a and 1b from the initial position indicated by a solid line to the drawn-out position indicated by a dash line, with axes 4a and 4b being the centers of rotation, and by the engagement of the tape 62 with the tape rollers 2a and 2b on the top ends of the arms 1a and 1b, the tape 62 is drawn out from the tape cartridge 6 and a tape running path for bringing the tape 62 into contact with a stationary magnetic head 8 and stationary guides 9a and 9b is formed as indicated by a dash line. After termination of recording/reproduction (reading/writing) by the stationary magnetic head 8, the motors 5a and 5b are reversely rotated to return the arms 1a and 1b to the initial position indicated by a solid line from the drawn-out position indicated by a dash line, whereby the tape 62 is restored in the tape cartridge 6. Sensors 7a and 7b are disposed to detect the arms 1a and 1b at their initial position, and sensors 7c and 7d are disposed to detect the arms 1a and 1b at their tape drawn-out position.

Figure 21:
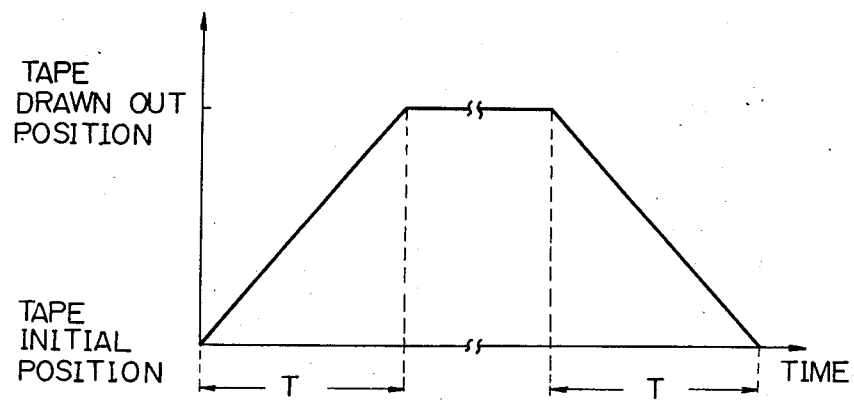
FIG. 21 is a diagram illustrating the problem arising in the structure shown in FIG. 20.

In this tape draw-out mechanism, as shown in FIG. 21, the tape draw-out time T necessary for the tape draw-out members 3a and 3b to move from the initial position to the tape drawn-out position depends on the rotation speed of the arms 1a and 1b, and this speed is set so that an excessive tension is not imposed on the tape 62 when the tape 62 is drawn out. The return time required for the arms 1a and 1b to move to the initial position from the tape drawn-out position is the same as the time T above because the arms 1a and 1b are reversely rotated at the same rotation speed as described above. Therefore, when the tape is to be rewound by a fast rewind operation, an excessive time is required before the rewinding operation can be started after the termination of recording or reproduction by the stationary magnetic head 8. Especially in a magnetic tape device of the type where recording and reproduction are continuously and automatically carried out, the time required for handling each cartridge is prolonged and such wasted time accumulates and lowers the operation efficiency.

The present invention will now be described in detail with reference to embodiments illustrated in the accompanying drawings.

Figure 1:
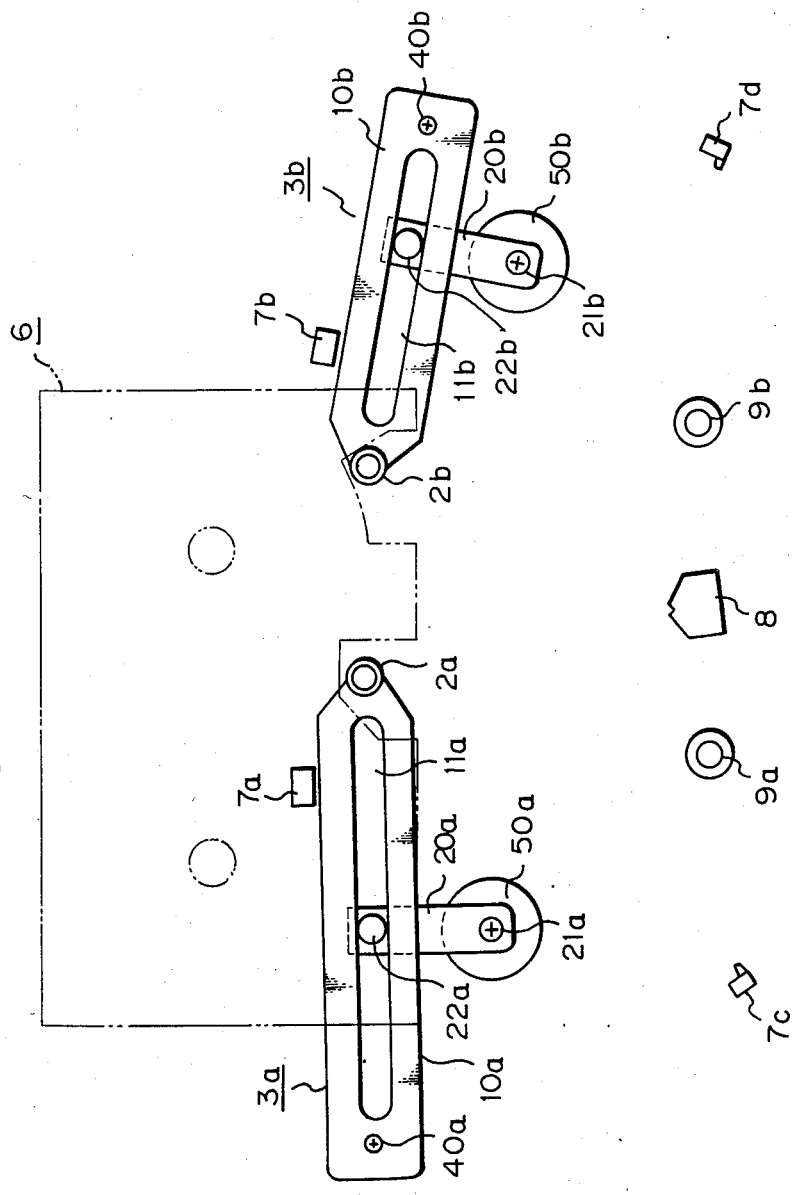
FIG. 1 is a diagram of the structure of one embodiment of the present invention.

FIG. 1 is a diagram of the structure of one embodiment of the present invention. The same members as those shown in FIG. 20 are indicated by the same reference numerals. In FIG. 1, tape rollers 2a and 2b are mounted on one ends of arms 10a and 10b, respectively, and linear link grooves 11a and 11b are formed in the central portions of the arms 10a and 10b and the arms 10a and 10b can be turned with fulcra 40a and 40b, arranged on the other ends, as the centers of rotation. Crank plates 20a and 20b have on one ends thereof engaging rollers 22a and 22b to be engated with the link grooves 11a and 11b of the arms 10a and 10b and the crank plates 20a and 20b can be rotated with shafts 21a and 21b arranged on the other ends being the centers of rotation. Motors 50a and 50b (driving sources) are connected to the shafts 21a and 21b of the crank plates 20a and 20b and are capable of rotating, with the shafts 21a and 21b of the crank plates 20a and 20b as the centers of rotation.

Accordingly, the arms 10a and 10b constitute a swinging slide crank mechanism in which, by the rotation of the motors 50a and 50b, the crank plates 20a and 20b are rotated with the shafts 21a and 21b as the centers of rotation to slide the engaging rollers 22a and 22b of the crank plates 20a and 20b along the link grooves 11a and 11b and swing the arms 10a and 10b with the fulcra 40a and 40b as the centers of rotation.

Figure 2:
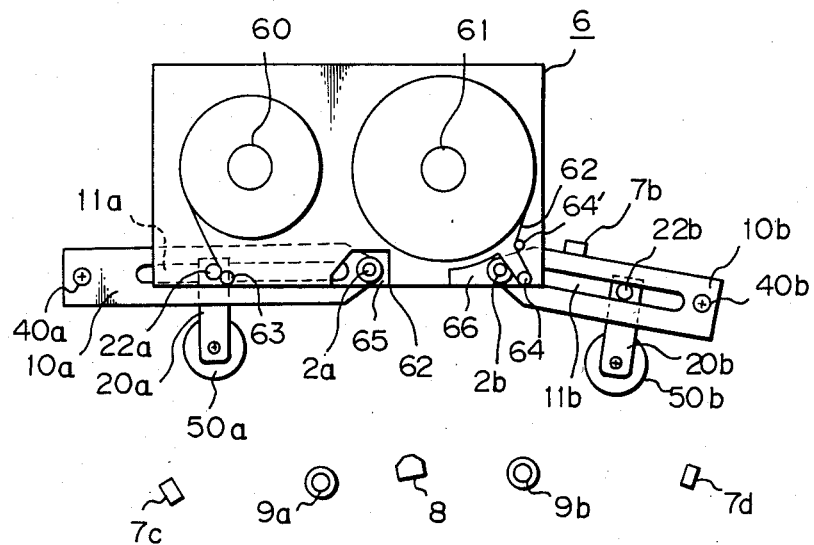
FIG. 2(A) is a diagram of the operation of the structure shown in FIG. 1 and showing the apparatus with the tape cartridge in the loaded position with the arms at the initial position.
FIG. 2(B) is a view similar to FIG. 2(A) showing the arms rotated clockwise and counterclockwise; respectively, as the tape is withdrawn from the cartridge.
FIG. 2(C) is a further view similar to FIG. 2(A) and FIG. 2(B) but showing the arm further rotated in withdrawing the tape.
FIG. 2(D) is still a further view similar to FIG. 2(A), FIG. 2(B) and FIG. 2(C) but showing the arms further rotated in returning the tape to the cartridge.
Figure 2:
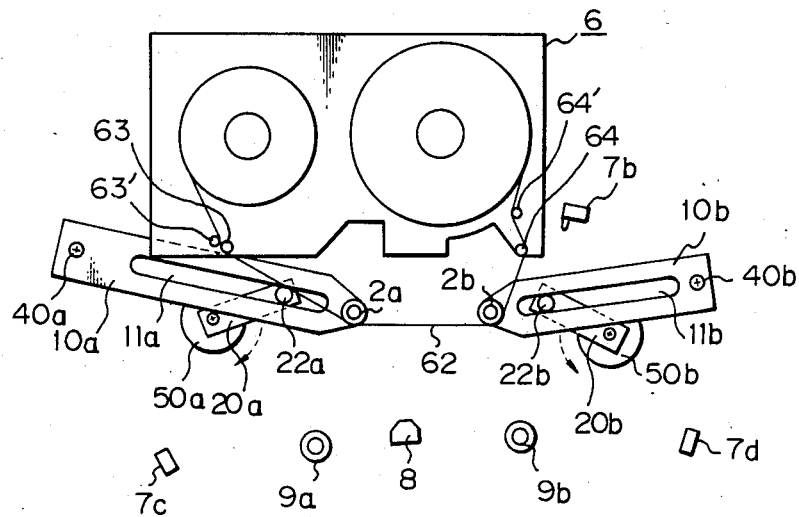

The operation of the structure of the embodiment shown in FIG. 1 will now be described with reference to the operation diagram of FIG. 2.

When the tape cartridge 6 is loaded on the driving mechanism, as shown in FIG. 2(A), the tape rollers 2a and 2b on the top ends of the arms 10a and 10b are intruded into the draw-out recesses 65 and 66 of the tape cartridge 6, and the tape 62 of the tape cartridge 6 is spread between the guides 63, 63' and 64, 64' of the tape cartridge 6. The position of the arms 10a and 10b is designated as the initial position.

Then, as shown in FIG. 2(B), the motor 50a is rotated clockwise and the motor 50b is rotated counterclockwise. The clockwise rotation of the motor 50a causes the crank plate 20a to be rotated clockwise and the engaging roller 22a on the top end of the crank plate 20a is thus slid to the right in the drawings along the link groove 11a of the arm 10a, whereby the arm 10a is turned clockwise with the fulcrum 40a as the center of rotation and the tape 62 is drawn out by the tape roller 2a on the top end of the arm 10a. Similarly, the counterclockwise rotation of the motor 50b causes the crank plate 20b to be rotated counterclockwise and the engaging roller 22b on the top end of the crank plate 20b is thus slid to the left in the drawings along the link groove 11b of the arm 10b, whereby the arm 10b is rotated counterclockwise with the fulcrum 40b as the center of rotation and the tape 62 is drawn out by the tape roller 2b on the top end of the arm 10b.

Accordingly, when the motor 50a is rotated clockwise and the motor 50b is rotated counterclockwise, the engaging roller 22a of the crank plate 20a is slid toward the tape roller 2a along the link groove 11a of the arm 10a and is slid again in the direction opposite to the tape roller 2a to turn the arm 10a clockwise. Similarly, the engaging roller 22b of the crank plate 20b is slid toward the tape roller 2b along the link groove 11b of the arm 10b and is slid again in the direction opposite to the tape roller 2b to turn the arm 10b counterclockwise.

Figure 2C:
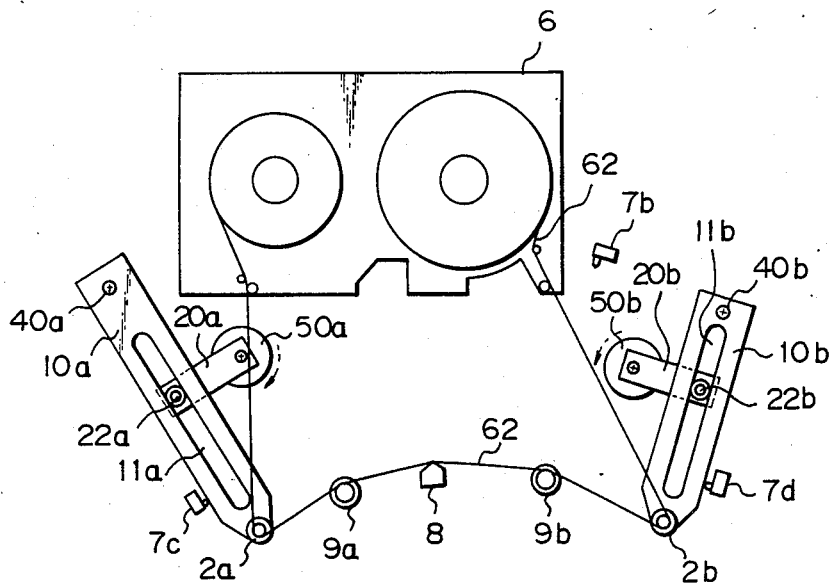

When the arms 10a and 10b are thus turned to the tape drawn-out position as shown in FIG. 2(C), this is detected by tape drawn-out position detecting sensors 7c and 7d, and by outputs of the sensors 7c and 7d, the rotation of the motors 50a and 50b is stopped and the draw-out operation is completed. At this point, the tape 62 comes into contact with the stationary magnetic head 8 through the stationary guides 9a and 9b and a tape running path for read/write operation is formed. The quantity of rotation of the motors 50a and 50b required for moving the arms 10a and 10b to the tape drawn-out position from the initial position is $\theta1$, as shown in FIG. 3(A).

Figure 2D:
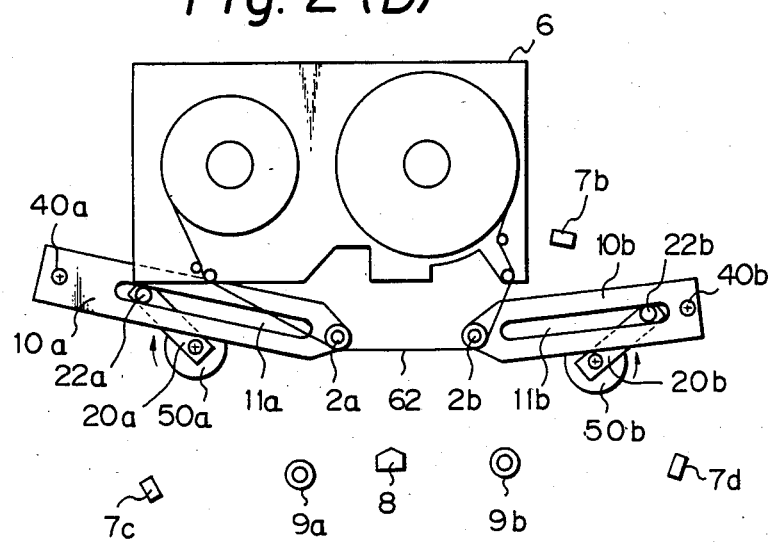

To return the tape 62 after a read/write operation of the tape 62 by the stationary magnetic head, the motor 50a, is rotated clockwise as in the draw-out operation and the motor 50b is rotated counterclockwise whereby, as shown in FIG. 2(D), the crank plate 20a is rotated clockwise and the engaging roller 22a on the top end of the crank plate 20a is slid toward the fulcrum 40a along the link groove 11a of the arm 10a to turn the arm 10a counterclockwise. Similarly, the crank plate 20b is rotated counterclockwise and the engaging roller 22b on the top end of the crank plate 20b is slid toward the fulcrum 40b along the link groove 11b of the arm 10b to turn the arm 10b clockwise.

Thus, when the motor 50a is rotated clockwise and the motor 50b is rotated counterclockwise, the engaging roller 22a of the crank plate 20a is slid toward the fulcrum 40a along the link groove 11a of the arm 10a and then reversely slid toward the tape roller 2a to further turn the arm 10a counterclockwise, while the engaging roller 22b of the crank plate 20b is slid toward the fulcrum 40b along the link groove 11b of the arm 10b and then reversely slid toward the tape roller 2b to further turn the arm 10b clockwise. When the arms 10a and 10b are thus turned to the initial position as shown in FIG. 2(A), this is detected by initial position detecting sensors 7a and 7b, and by the outputs of the sensors 7a and 7b, the rotation of the motors 50a and 50b is stopped and the operation of returning the tape 62 is completed. The quantity of rotation of the motors 50a and 50b required for moving the arms 10a and 10b to the initial position from the tape drawn-out position is $\theta2$, as shown in FIG. 3(A).

Figure 3A:
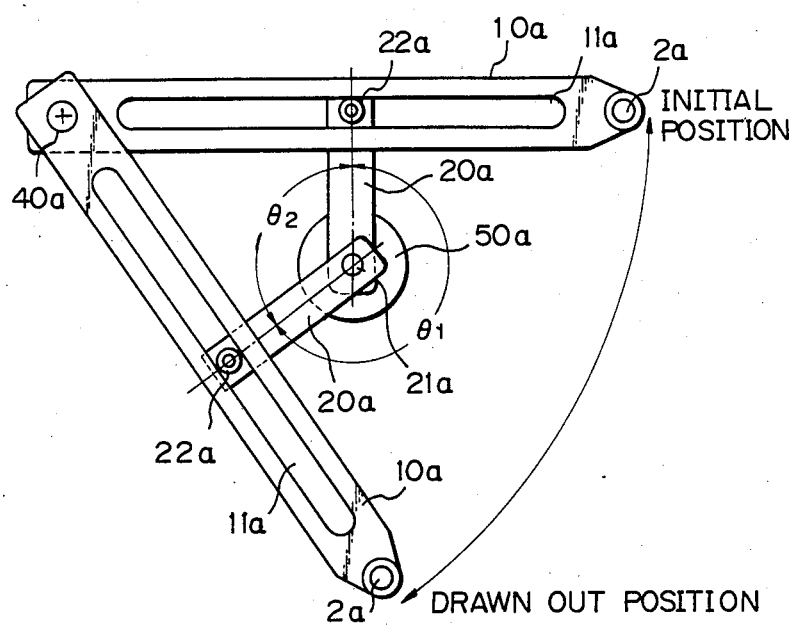
FIG. 3(A) is a detailed diagram of the operation of the structure shown in FIG. 1 and showing the rotation required for moving the tape from the initial to the drawn-out position.

If the positions of the fulcra 40a and 40b of the arms 10a and 10b are set relative to the shafts 21a and 21b of the crank plates 20a and 20b so that the rotation angle $\theta1$ for the draw-out operation is larger than the rotation angle $\theta2$ for the return operation as shown in FIG. 3(A), the rotation speed of the arms 10a and 10b for the return operation can be made higher than the rotation speed of the arms 10a and 10b for the draw-out operation, therefore the time required for returning is shorter than the time required for drawing-out, and thus the return time can be shortened.

Furthermore, if the position of the fulcrum 40a (40b) is set so that at the initial position and drawn-out position, the longitudinal direction of the link groove 11a (11b) of the arm 10a (10b) is orthogonal to the longitudinal direction of the crank plate 20a (20b) as shown in FIG. 3(A), the arm 10a (10b) is reciprocated only between the initial position and the tape drawn-out position, i.e., the movable range of the arm is defined by the initial position and the drawn-out position. In this case, the relationship $\theta1 \approx 2\theta2$ is established between $\theta1$ and $\theta2$, and the return time may be reduced to about ½ of the draw-out time.

Figure 3B:
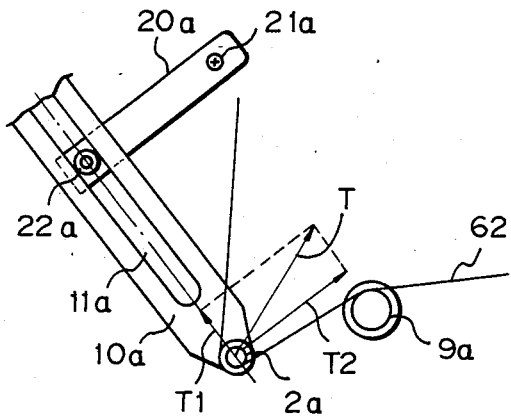
FIG. 3(B) is a view similar to FIG. 3(A) but showing the tape and tape tension applied to the arm and crank plate.

If the above-mentioned orthogonal relationship is maintained at the tape drawn-out position, as shown in FIG. 3(B), when tape tension is applied to the tape roller 2a (2b) by the tape 62, the direction of the component 11 of this tape tension is in agreement with the longitudinal direction of the arm 10a and is orthogonal to the longitudinal direction of the crank plate 20a. Accordingly, no rotating force is imparted to the crank plate 20a (20b). Furthermore, since the direction of the other component T2 of the tape tension is in agreement with the longitudinal direction of the crank plate 20a (20b), a rotating force cannot be imparted to the crank plate 20a (20b). Accordingly, since the crank plate 20a (20b) is not rotated by the tape tension of the tape 62, the tape drawn-out position can be stably maintained.

Similarly, since the orthogonal relationship is maintained also at the initial position, even if an external force is applied to the arm 10a or 10b by unloading or loading of the cartridge 6, the initial position can be stably maintained. Accordingly, maintenance of the arm position by the crank mechanism becomes possible, and hence, a motor having a large torque against rotation by the outer force is not needed for maintaining the arm position.

Moreover, since the return operation can be accomplished even without reverse rotation of the motors 50a and 50b and the rotation direction need not be changed, a control circuit for driving the motors 50a and 50b is simplified. If the control circuit malfunctions and a driving electric current continues to flow into the motors, the arms only continue to reciprocate between the initial position and the tape drawn-out position and there is no risk of damage to the motors.

Another embodiment of the present invention will now be described.

Figure 4:
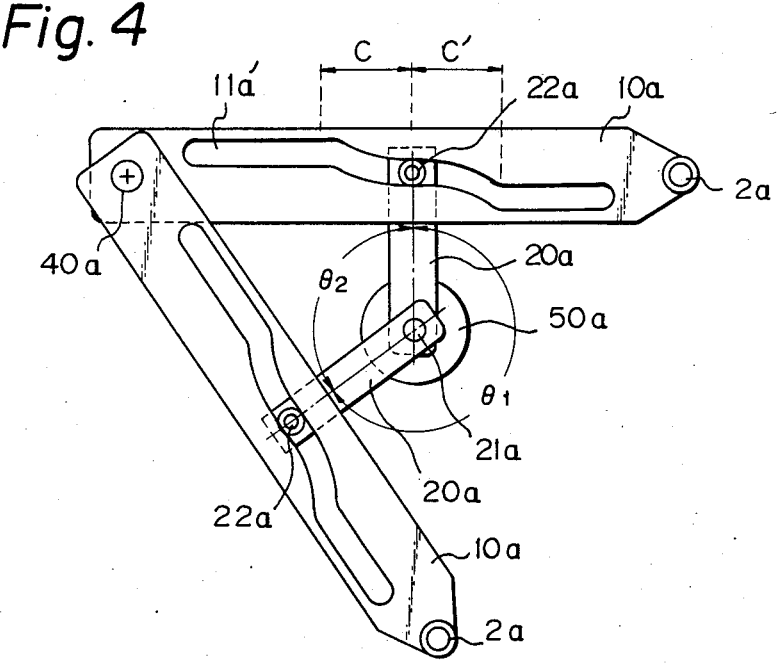
FIG. 4 is a diagram of the structure of another embodiment of the present invention.

FIG. 4 is a diagram of a main part of the structure of this embodiment, wherein only the tape draw-out mechanism is shown. The same members as in FIG. 1 are represented by the same reference numerals. In FIG. 4, reference numeral 11a' represents a link groove. The link groove 11a' is formed in a shape such that arcuate portions c and c' having a radius corresponding to the length of the crank plate 20a are formed along a predetermined length from the position where the longitudinal direction of the crank plate 20a is orthogonal to the longitudinal direction of the arm 10a (the position of the engaging roller 22a in FIG. 4). The reason for this special shape of the link groove 11a' is as follows.

Positioning of the arm 10a at the tape drawn-out position is accomplished by stopping the rotation of the motor 50a driving the crank plate 20a through a detection signal for the arm 10a emitted by the sensor 7c. Where the link groove 11a is linear as in the first embodiment, if the driving motor 50a overruns the stop position, the position of the arm 10a is changed at the time of drawing out the tape. In this case, the contact angle of the tape 62 to the stationary guides 9a and 9b is changed to reduce the angle of winding of the tape 62 to the stationary guides 9a and 9b, and as the result, the vibration absorbing characteristics of the tape 62 are changed and it is feared that an adverse influences will be imposed on the recording and reproduction characteristics.

Also, positioning of the arm 10a at the initial position when returning the tape is accomplished by stopping the rotation of the motor 50a driving the crank plate 20a by a detection signal for the arm 10a emitted by the sensor 7a. In this case, if the driving motor 50a should overrun beyond the stop position, the tape 62 does not completely enter the tape cartridge 6, and when the tape cartridge 6 is drawn out by the driving mechanism, it is apprehended that the tape will be caught in some other part of the device and it will become impossible to draw out the tape cartridge 6.

To avoid this disadvantage, in this embodiment, the link groove is not made linear but is formed to have arcuate portions c and c' as shown in FIG. 4, and the length of the arcuate portions is set according to the angle of estimated overrunning at the time of stopping the motor.

The link groove of the arm 10b is formed to have a similar shape.

Figure 5:
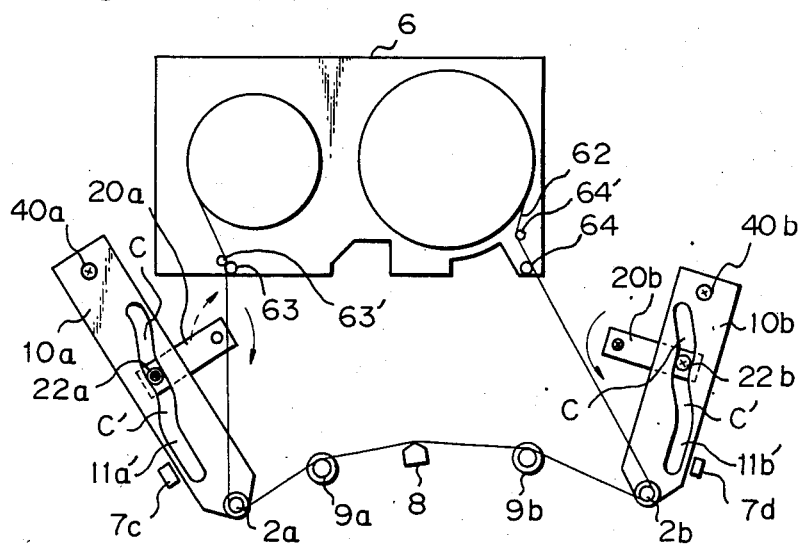
FIG. 5 is a diagram of the operation of the structure shown in FIG. 4.

The operation of the structure of the embodiment shown in FIG. 4 will now be described with reference to the operation diagram of FIG. 5. Positioning of the tape 62 taken out from the tape cartridge 6 by the arms 10a and 10b at the tape drawn-out position for forming the predetermined tape running path is accomplished by stopping the rotation of the motors 50a and 50b on detection of the arms 10a and 10b by the sensors 7c and 7d. At this time, if the tape drawn-out position is normal, the crank plates 20a and 20b are orthogonal to the arms 10a and 10b. Even if the motors 50a and 50b stop after overrunning, since the engaging rollers 22a and 22b of the crank plates 20a and 20b move in the arcuate portions c of the link grooves 11a' and 11b' and do not rotate the arms 10a and 10b, the positions of the tape rollers 2a and 2b of the arms 10a and 10b in contact with the tape 62 are not changed but are precisely positioned at a predetermined point. Accordingly, a high-precision tape running path can be formed and a stable vibration absorbing characteristic of the tape between the stationary guides 9a and 9b is obtained.

Stopping of the arms 10a and 10b at the time of returning the tape is accomplished by stopping the rotation of the motors 50a and 50b driving the crank plates 20a and 20b by the signals detecting the arms 10a and 10b emitted by the sensors 7a and 7b (see FIG. 1). Also in this case, even if the driving motors 50a and 50b stop after overrunning, the engaging rollers 2a and 2b of the crank plates 20a and 20b move in the arcuate portions c' of the link grooves 11a' and 11b' and do not rotate the arms 10a and 10b, and hence, the arms 10a and 10b precisely stopped at the original initial position and do not deviate from that position. As a result, the returned tape 62 is completely contained in the tape cartridge 6 and the tape surface becomes linear along the side face of the tape cartridge 6 [see FIG. 2(A)], and therefore, the tape 62 is not caught by some other member and the tape cartridge can be smoothly drawn out by the driving mechanism.

As is apparent from the foregoing description, in the present embodiment, even if overrunning of the motor occurs, the initial position and tape drawn-out position remain constant and are not changed. Accordingly, a tape running path having a high positional precision can be formed, the recording and reproduction characteristics can be improved, and the tape cartridge can be smoothly drawn out.

Still another embodiment of the present invention will now be described.

Figure 6:
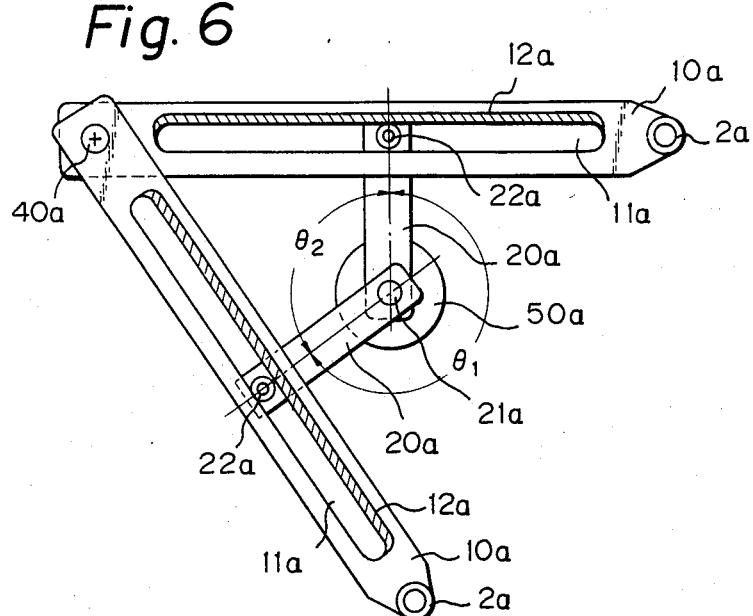
FIG. 6 is a diagram of the structure of still another embodiment of the present invention.
Figure 7:
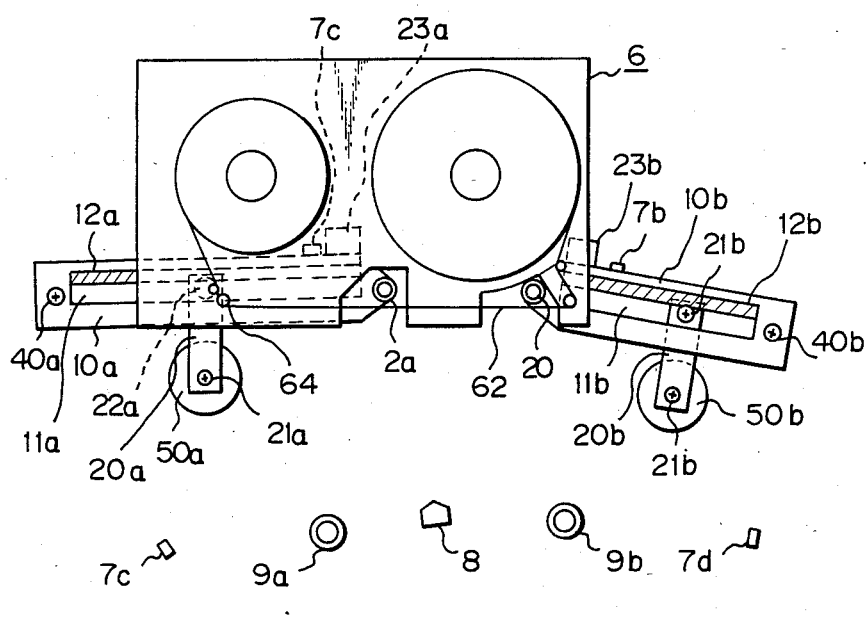
FIG. 7 is a diagram of the operation of the structure shown in FIG. 6.

FIGS. 6 and 7 are diagrams of the structure of a main part of still another embodiment of the present invention, wherein only the tape draw-out mechanism is shown. In FIGS. 6 and 7, the same members as shown in FIG. 1 are indicated by the same reference numerals. In the figures, each reference numeral 12a and 12b represents an elastic member. The elastic members 12a and 12b are arranged on one side (top side in the drawings) of the link grooves 11a and 11b along the link grooves 11a and 11b. The elastic members 12a and 12b are composed of a rubber or the like. Stoppers 23a and 23b are disposed to forcibly set the arms 10a and 10b at the initial position.

The reason for adoption of this structure will now be described.

As pointed out hereinbefore, if the initial position of the tape rollers 2a and 2b of the arms 10a and 10b is not precise, when the tape cartridge 6 is attached by the cartridge attaching mechanism to the supply reel boss and take-up reel boss, the tape rollers 2a and 2b impinge against the tape cartridge 6, and it is feared that a proper attachment will not be attained. Furthermore, in this case, the tape rollers 2a and 2b come into contact with the tape 62 and there is a risk of damage to the tape 62.

Furthermore, if the tape rollers 2a and 2b of the arms 10a and 10b are not precisely set at the tape drawn-out position, the winding angles of the tape 62 relative to the tape rollers 2a and 2b, the stationary guides 9a and 9b and the guides 63 and 64 in the tape cartridge 6 are changed to change the frictional forces between the tape and these guides, and therefore, it is feared that an adverse influence will be imposed on the recording and reproduction characteristics.

Since the two positions of the tape rollers 2a and 2b are determined by the positions of the fulcra 40a and 40b of the arms 10a and 10b and the driving shafts 21a and 21b, if one position (fulcrum position) is first adjusted and the other position (driving shaft position) is then adjusted, the first adjusted position becomes, misaligned, and it is difficult to precisely adjust both positions.

According to the present embodiment of the present invention, this problem is solved in the following manner. Namely, the elastic members 12a and 12b are arranged on the link grooves 11a and 11b on the side faces opposite to the crank plates 20a and 20b at the initial position, and the stoppers 23a and 23b are disposed to regulate the positions of the arms 10a and 10b. In this arrangement, positional disorder at the initial position due to the two adjustment operations at the initial position and the drawn-out position of the fulcrum position and the driving shaft position is absorbed by pressure on and deformation of the elastic members 12a, and 12b by the tape rollers 2a and 2b and by setting the positions of the tape rollers 2a and 2b by the stoppers 23a and 23b.

More specifically, the initial position is settled, as shown in FIG. 7, by abutting the arms 10a and 10b against the stoppers 23a and 23b, and pressing engaging rollers 22a and 22b against the elastic members 12a and 12b, so that the positional disorders can be absorbed by deformation of the elastic members. In contrast, at the tape drawn-out position, since the positions of the tape rollers 2a and 2b are determined by the positions of the engaging rollers 22a and 22b in the link grooves 11a and 11b shown in FIG. 6, the positions of the tape rollers 2a and 2b can be precisely set by adjusting the positions of only the shafts of the motors 50a and 50b, that is, the positions of the shafts 21a and 21b of the crank plates 20a and 20b.

There may be considered a structure in which the initial position is adjusted by the motor shafts 21a and 21b and the tape drawn-out position is adjusted by the stoppers 23a and 23b incorporated with the elastic member. In this case, however, since the tape comes into contact with the tape rollers 2a and 2b at the tape drawn-out position and tape tension is imposed on the tape rollers 2a and 2b, the relatively soft rubbers (elastic members) 12a and 12b are deformed by the tape tension and the positions of the tape rollers 2a and 2b, become unstable. Accordingly, this structure is not preferred. Therefore, the drawn-out position of the tape rollers 2a and 2b is preferably set by bringing relatively rigid engaging rollers 22a and 22b into contact with the link grooves 11a and 11b. On the other hand, at the initial position, since the tape 62 does to come into contact with the tape rollers 2a and 2b. *the postion of the tape rollers 2a and 2b is not changed even if positioning is effected through the rubbers (elastic members) 12a and 12b.*

According to the embodiment having the above-mentioned structure, the adjustment of the positions of the tape rollers 2a and 2b at the initial position and at the drawn-out position can be accomplished easily and precisely.

The operation of quick tape feeding of the read/write device having the above-mentioned tape draw-out structure will now be described.

Figure 8:
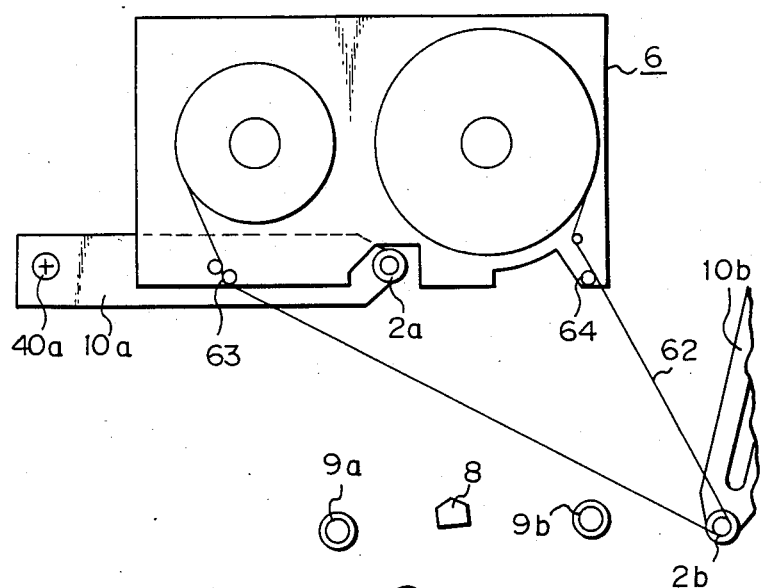
FIGS. 8 and 9 are diagrams of a quick feeding operation in the embodiments of the present invention.
Figure 9:
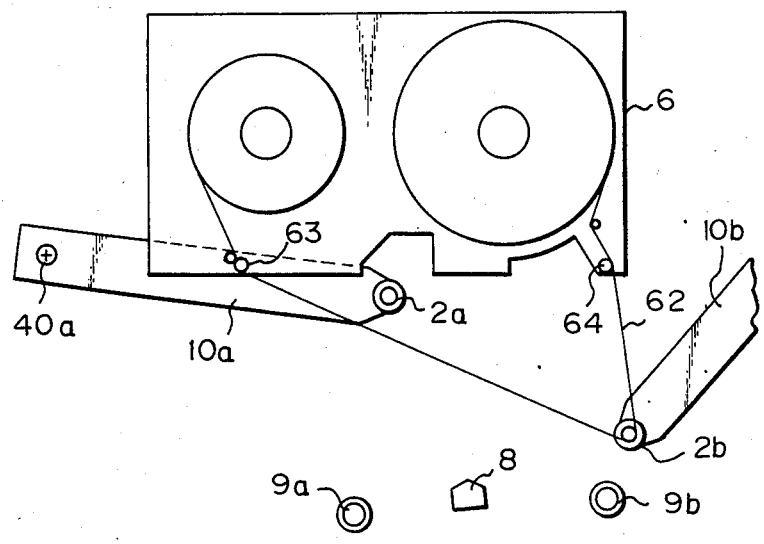

FIGS. 8 and 9 are diagrams illustrating the quick feeding operation by the tape draw-out mechanism of the present invention. In FIGS. 8 and 9, the same members as in FIG. 1 are represented by the same reference numerals.

According to the conventional technique, for quick feeding of the tape 62 drawn out from the tape cartridge 6, as shown in FIG. 2(B) or 2(D), a tape running path where the tape 62 is separated from the stationary guides 9a and 9b and the stationary magnetic head 8 is formed to prevent the recording surface of the tape 62 from being damaged by high-speed contact of the tape 62 with the stationary guides 9a and 9b.

This tape running path is formed by placing the drawn-out tape 62 in contact with at least two tape guides (tape rollers) 2a and 2b outside the tape cartridge 6. The upper and lower ends of the tape guides 2a and 2b are flanged to guide the tape 62, and gaps in the height direction are necessary for rotatably attaching the arms 10a and 10b with the fulcra 40a and 40b as the centers of rotation. Because of these gaps and precision limitations of parts constituting the arms 10a and 10b, it is impossible to make the heights of the tape guides 2a and 2b equal to each other and a difference is produced between the two heights. Furthermore, since the distance between the two tape guides 2a and 2b is short, the influence of the difference between the heights of the tape guides 2a and 2b is increased, and at the time of quick feeding, the edges of the tape 62 are readily damaged by the flanges of the tape guides 2a and 2b due to the difference in height between the two guides.

In order to obviate this disadvantage, in the present embodiment, the tape drawn out from the tape cartridge is brought into contact with only one tape guide outside the tape cartridge, whereby damage to the tape is reduced.

Referring to FIG. 8, when the recording-reproduction operation (read/write operation) shown in FIG. 2(C) is changed to the quick feeding operation, the left arm 10a. in FIG. 8 is driven to restore the initial position but the right arm 10b in FIG. 8 is not driven. Accordingly, the right tape guide 2b is not moved, and the tape running path formed by the tape guide 2b and the tape 62 is separated from the stationary guides 9a and 9b and the stationary magnetic head 8, as shown in FIG. 8.

The frequency of contact of the tape 62 with the tape guide outside the tape cartridge 6 is thus reduced by one, and thus damage to the tape 62 is reduced. Especially when the flanged tape guides are used, the tape 62 is brought into contact with only one tape guide (only the tape guide 2b), and the distance between this tape guide 2b and the tape guides in the tape cartridge is prolonged. Therefore, even if there is a difference in height among a plurality of tape guides 2b, 63, and 64, damage to the edges of the tape 62 by the flange of the tape guide 2b can be reduced (from the experimental results, it was confirmed that a tape having a life of 1000 passes in the conventional structure can endure 2000 passes without trouble).

Furthermore, there may be adopted a modification in which, as shown in FIG. 9, the right arm 10b in the drawings is slightly returned toward the initial position from the tape drawn-out position. Also, the left arm 10a need not be returned to the initial position but it is sufficient if the left arm 10a is returned to the point where it does not come into contact with the tape 62.

Still another embodiment of the present invention will now be described.

Figure 10:
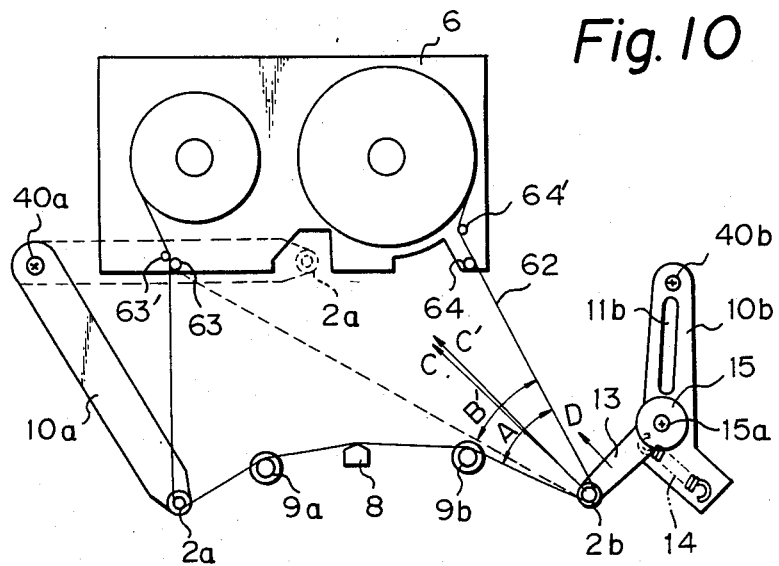
FIG. 10 is a diagram of the structure of still another embodiment of the present invention.

FIG. 10 is a diagram of still another embodiment of the present invention. In FIG. 10, the same members as shown in FIG. 1 are represented by the same reference numerals. In the figure, the tape roller 2b is mounted on a rotary arm 13 and the arm 13 can rotate relative to the arm 10b with the fulcrum 15a as the center of rotation. A spring 14 is disposed to urge the rotary arm 13 counterclockwise with the fulcrum 15a as the center of rotation, and a potentiometer (angle detector) 15 is arranged at the fulcrum 15a to detect the rotation angle of the rotary arm 13. Namely, a detecting mechanism for detecting the tape tension imposed on the tape roller 2b is arranged on the arm 10b.

The operation of this embodiment will now be described. At the tape drawn out position indicated by a solid line in FIG. 10, the tape tension given to the tape roller 2b is proportional to the rotation angle of the rotary arm and this is detected by the potentiometer 15 to change the delivery speed of the reel motor and keep the tape tension constant.

At the time of quick feeding, as described above with reference to FIG. 8, only the arm 10a is returned to the position indicated by dash line in FIG. 10, and the arm 10b is not moved.

Accordingly, the position of the tape roller 2b at the time of quick feeding is not changed from its position at the time of recording and reproduction. Therefore, the angle B' between the tape 62 and the tape guide 2b at the time of quick feeding is almost the same as the angle A between the tape 62 and the tape guide 2b at the time of recording and reproduction, and the tape tension is not substantially changed. Also, the direction of the tape tension is prearranged so that the tape tension direction C at the time of recording and reproduction (tape angle is A) is parallel to the tangential direction D of the rotary movement of the arm 13, i.e., perpendicular to the arm 13 to obtain a maximum responsiveness of the arm 13 with respect to the tape tension. The tape tension direction C' at the time of quick feeding (tape angle is B') is almost the same as the direction C. Accordingly, the detection ability of the tape tension detecting device at the time of quick feeding is not substantially different from that at the time of recording and reproduction, and a tape running path in which the tape tension is stable can be obtained.

Figure 11:
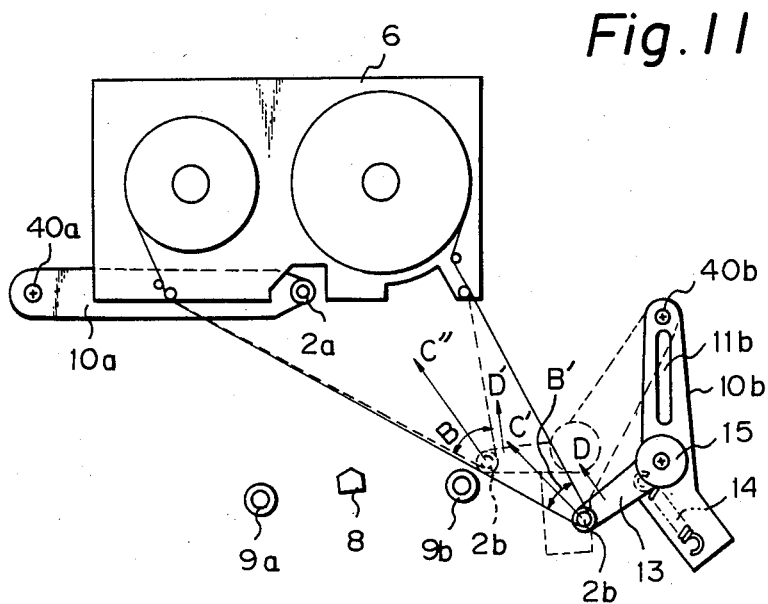
FIG. 11 is a diagram of a quick feeding operation in the structure shown in FIG. 10.

As shown in FIG. 11, if the arm 11b is first returned slightly as indicated by, a dash line and quick feeding is then carried out, since the angle A (FIG. 10) between the tape 62 and the tape guide 6b at the time of recording and reproduction is smaller than the angle B between the tape 62 and the tape guide 6b at the time of quick feeding, the tape tension imposed on the tape tension detecting mechanism at the quick feeding angle B is reduced. Also, the tape tension direction C'' (tape angle is B) at the time of quick feeding is deviated from the tangential direction D' of the rotary movement of the arm 13 at the position of quick feeding. Therefore, a minute change of the tension cannot be easily detected, and therefore, a problem of degradation of the tape tension detecting ability arises.

Accordingly, in the present embodiment, by making the position of the arm 10b at the time of quick feeding equal to the position of the arm 10b at the time of recording and reproduction, the above-mentioned difference of the angle is eliminated and the detection of a minute change of the tape tension is made possible, whereby stable control of the tape tension is made possible even at the time of quick feeding.

Various modifications may be made to the foregoing embodiments without departing from the scope of the present invention, and these modifications are included in the scope of the present invention.

As is apparent from the foregoing description, according to the present invention, a tape drawn-out member to be engaged with a tape between a pair of reels is disposed and a driving means is arranged for reciprocating the tape draw-out member between the initial position and the tape drawn-out position and driving the tape draw-out member so that the return time required for returning the tape draw-out member to the initial position from the tape drawn-out position is shorter than the draw-out time for moving the draw-out member to the tape drawn-out position from the initial position, and drawing-out and return of the tape are accomplished by the reciprocating movement of the tape draw-out member. By dint of these characteristic features, there can be attained an effect of shortening the time required for returning the tape draw-out member to the initial position from the tape drawn-out position, whereby the time required for handling one cartridge (cassette) can be shortened and the mechanism of the present invention makes a contribution to the enhancemert of the capacity of the magnetic tape device. Moreover, there can be attained a practical effect of realizing the above improvement by a simple structure.

A cassette type magnetic tape device provided with the tape draw-out mechanism of the present invention will now be described.

Figure 12:
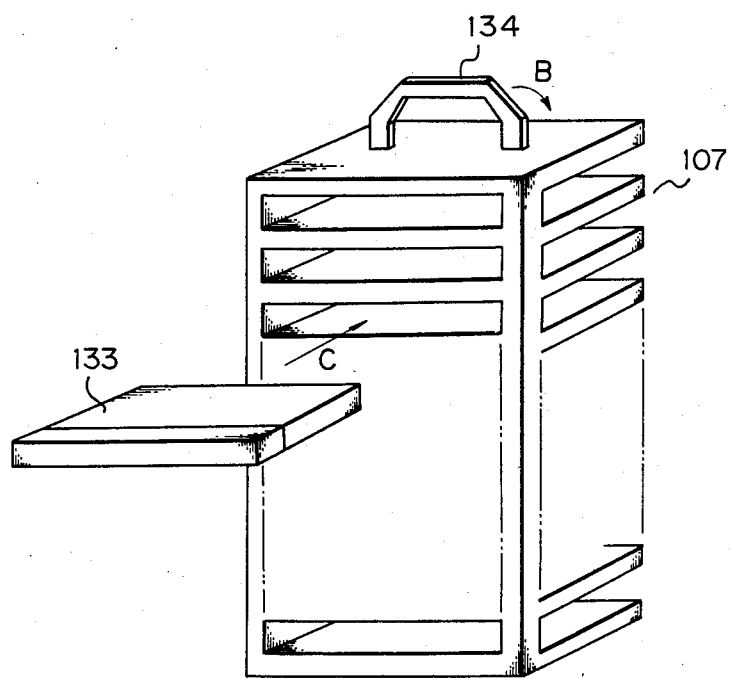
FIG. 12 is a perspective view of a magazine for containing therein a tape cassette to which the present invention is applied.

A magnetic disc device is used as read-out means capable of storing much information in a high density and promptly accessible to optional information positions. In this magnetic disc device, there is a risk that data will be lost by accidental head crush or the like. Accordingly, in view of the safety of data, it is preferred that data in a magnetic disc be once transferred to a magnetic tape and stored therein. In this case, the magnetic tape is contained in a cassette 133 (same as the cassette 6 in the foregoing embodiments), as shown in FIG. 12, and these cassettes are contained in a plurality of stages horizontally in a magazine (cassette holder) as indicated by arrow C. A handle 134 foldable in the direction indicated by arrow B is arranged in the top portion of the magazine 107 to facilitate the transportation of the magazine 107 or attachment or dismounting of the magazine 107 to or from the magnetic tape device.

Figure 13:
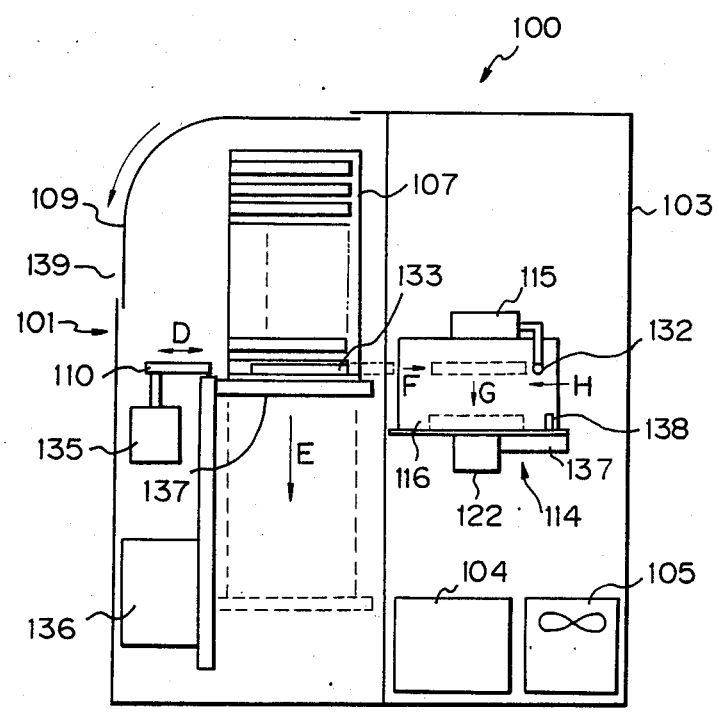
FIG. 13 is a schematic diagram of a magnetic tape device to which the present invention is applied.

An embodiment of the magnetic tape device in which this cassette magazine 107 is contained is illustrated in FIG. 13. As described hereinafter, two magnetic tape device units 101 (one is shown in FIG. 13) are attached to a common frame 103 in the magnetic tape device 100. The magnetic tape device unit 101 comprises a supporting stand 137 for loading and holding the magazine 107 thereon, a lift mechanism 136 for vertically moving the supporting stand 137, read/write means 114 including the magnetic head 138, a winding motor 122, and a tape draw-out mechanism 137 as described hereinbefore, a front loading mechanism 116 for automatically attaching a cassette 133 to the read/write means 114, a cassette push-out mechanism 135 including a member 110 which confronts an inlet of the front loading mechanism 116 and can be reciprocated as indicated by an arrow D to push out the cassette 133 contained in the magazine and push the cassette 133 into the front loading mechanism 116, a push-return mechanism 115 including a push-return member 132 for pushing the returning the cassette which has returned to the inlet of the front loading mechanism after the read/write operation, into the magazine 107, and an openable and closable shutter 109 for covering a magazine charging opening 139. A power source 104 and a cooling fan 105 are attached to the common frame 103.

Figure 14:
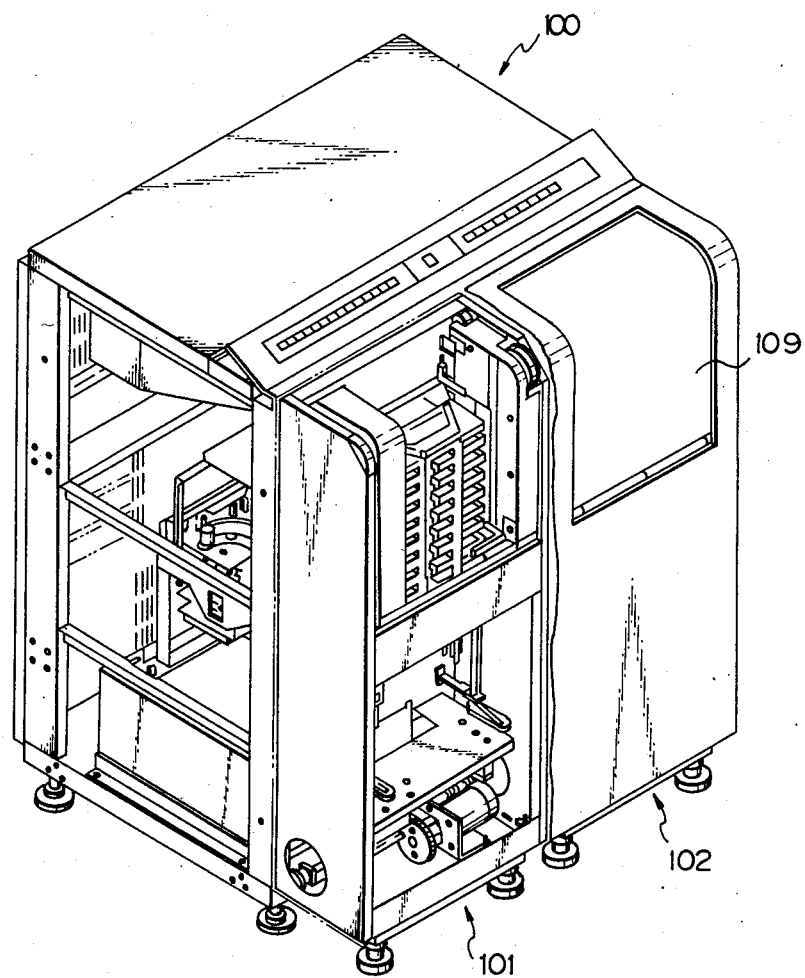
FIG. 14 is a perspective view of a magnetic tape device to which the present invention is applied.
Figure 15:
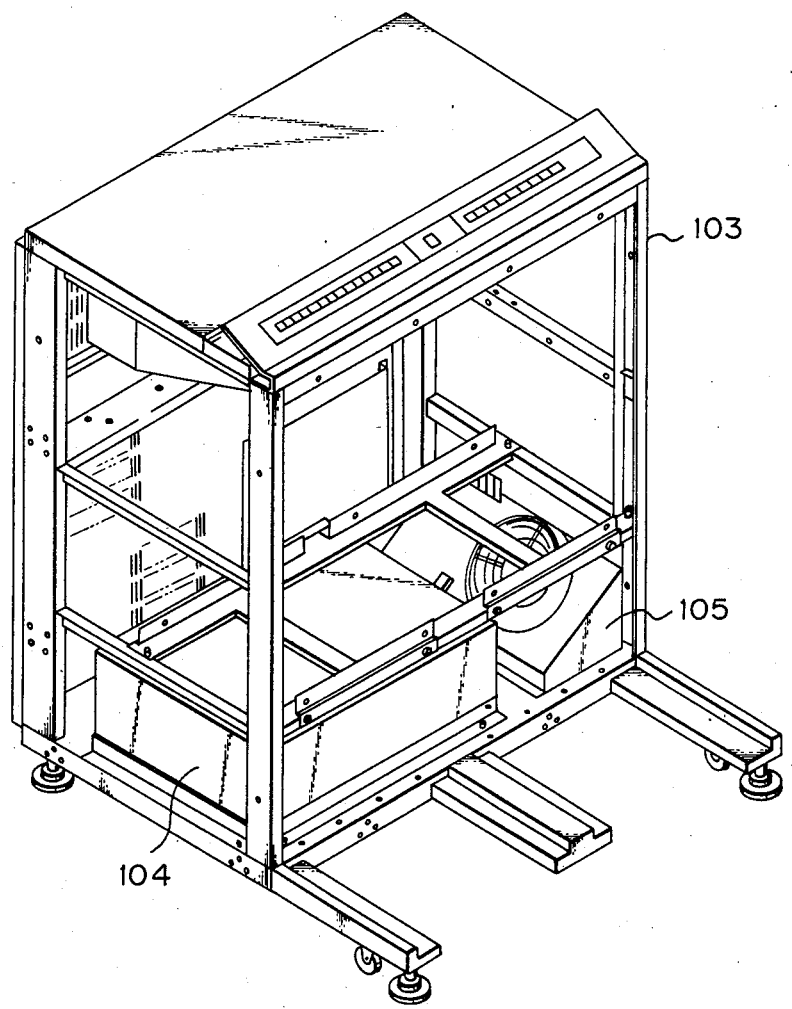
FIG. 15 is a perspective view of a common frame of the device shown in FIG. 14.
Figure 16:
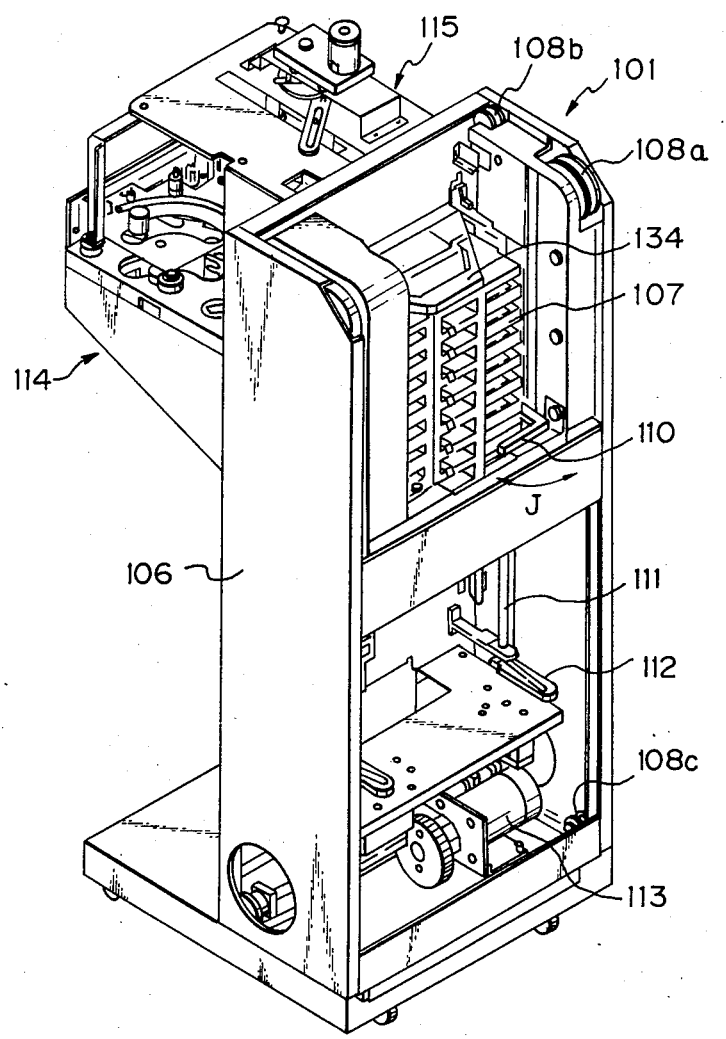
FIG. 16 is a perspective view of a magnetic tape device which constitutes a part of the device shown in FIG. 14.
Figure 17:
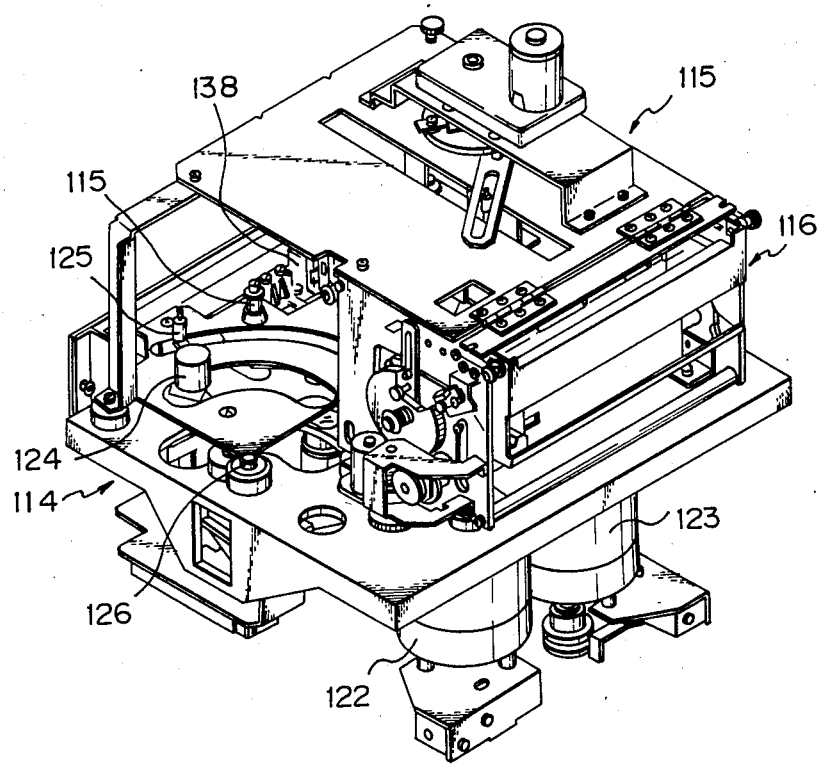
FIG. 17 is a perspective view of the main part of the device shown in FIG. 16.
Figure 18:
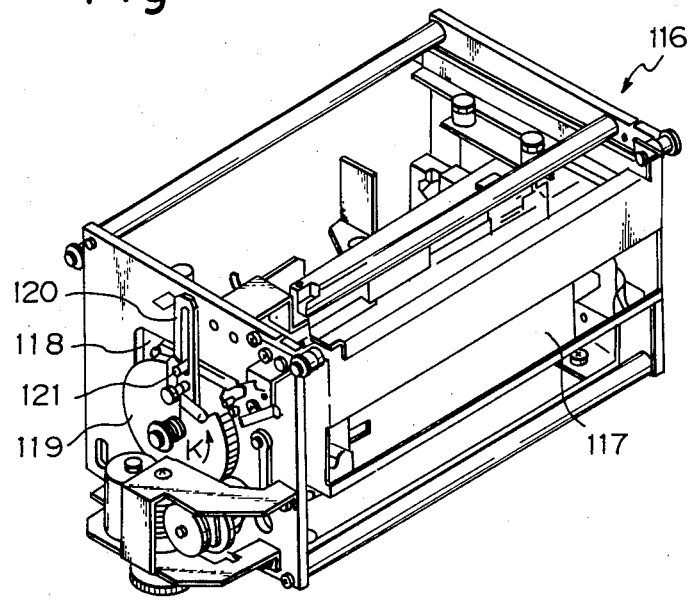
FIG. 18 is a perspective view showing a front loading mechanism of the device shown in FIG. 16.
Figure 19:
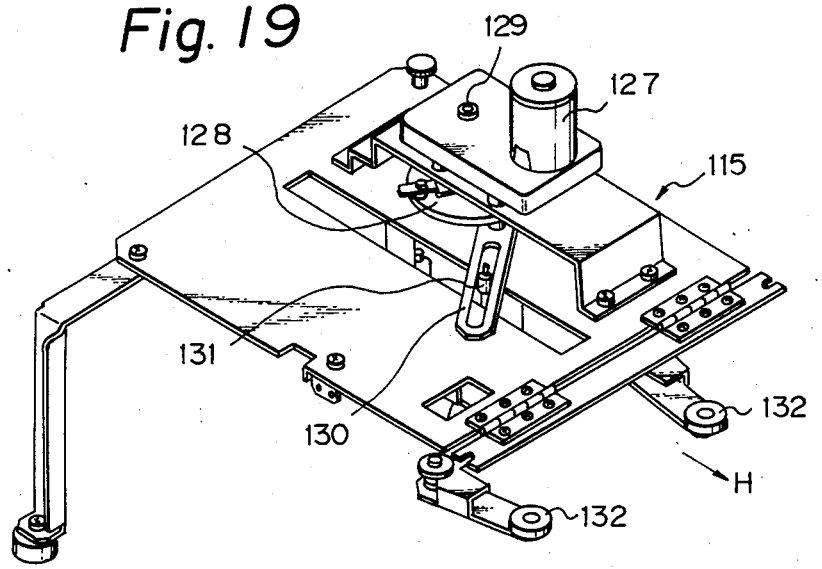
FIG. 19 is a perspective view showing a push-back mechanism of the device shown in FIG. 16.

A practical example of the magnetic tape device 100 having the above-mentioned structure is illustrated in perspective views of FIGS. 14 through 19. As shown in FIG. 14, the magnetic tape device 100 comprises two magnetic tape device units 101 and 102 having the same structure, and each of the units 101 and 102 has the shutter 109 arranged in the top portion of the front face. The structure of the common frame 103 to which the magnetic tape device units 101 and 102 are attached is illustrated in FIG. 15. The power source 104 and cooling fan 105 used commonly for the units 101 and 102 are arranged in the lower portion of the common frame 103. The magnetic tape device unit 101 is illustrated in FIG. 16. Four pulleys 108 (three pulleys 108a through 108c are seen in the drawing) are formed on the four corners of a side frame 106, respectively, and an endless belt (not shown) is engaged with these pulleys. The above-mentioned shutter 109 (see FIGS. 13 and 14) is attached to the endless belt, and one pulley is rotated and driven by a motor (not shown) to open or close the shutter 109. Initially, the magazine 107 is arranged in the upper portion of the unit 101 as shown in the drawings, and cassettes are treated in sequence from the cassette in the lowermost stage and when the treatment of one cassette is completed, the magazine is brought down (as indicated by arrow E in FIG. 13) by one stage by the lift mechanism 136 (see FIG. 13) and the subsequent cassette is treated. For example, the lift mechanism 136 comprises a spiral cam which rises by one stage at each one rotation, and the vertical movement of the magazine may be performed by a cam follower arranged on the supporting stand having the magazine 107 loaded thereon. A rack-pinion mechanism, an endless chain mechanism, or other appropriate moving mechanism may be used for the lift mechanism 136. The push-out member 110 of the push-out mechanism 135 (see FIG. 13) has an L-shape as shown in FIG. 16, and one end of the L-shape is secured to a rotary shaft 111 and is rotated and reciprocated as indicated by arrow J. The rotary shaft 111 is connected to a motor 113 through a rotation transmission mechanism 112 and driven by the motor 113. By the rotary movement of the L-shaped push-out member 110 in the magazine, the cassette 133 (see FIG. 13) in the magazine 107 is pushed into the inside of the unit 101. The read/write means 114 shown in FIG. 17, is arranged on the back face of the magnetic tape device unit 101, and the read/write means 114 comprises a magnetic head 138, a stationary tape guide 115, tape reel motors 122 and 133, and the above-mentioned tape draw-out mechanism. A tape roller 125 corresponds to the tape rollers 2a and 2b (see FIGS. 1 through 11) of the above-mentioned tape draw-out mechanism. A swing shaft 126 of the tape roller 125 corresponds to the rotation shafts 40a and 40b of the arms 10a and 10b, and a tension sensor 124 corresponds to the tension sensor 15 in the embodiment shown in FIG. 10. As shown in FIG. 18, the front loading mechanism 116 for setting the cassette at the read/write means has a cassette inserting opening 117 from which the cassette is horizontally inserted from the front. When the cassette is thus inserted, a disc 119 is rotated as indicated by arrow K to rotate and move a grooved link 120. A pin 121 connected to a cassette loading stand (not shown) is engaged with the groove of the grooved link 120 to move the cassette loading stand along an L-shaped guide groove 118. Accordingly, as shown in FIG. 13, the cassette is first moved in the horizontal direction as indicated by arrow F and then the cassette is brought down as indicated by arrow G and placed on the reel motors 122 and 123. A cassette push-return mechanism as shown in FIG. 19 is arranged in the upper portion of this front loading mechanism 116. The disc 128 is rotated with the shaft 129 as the center of rotation by the motor 127. A grooved arm 130 connected to this disc 128 moves a pin 131 linearly in the groove. A push roller 132 is connected to this pin 131 and is moved in the direction of arrow H to push-return the cassette into the magazine 107 (see FIG. 13) after the treatment. By repeating the above operations, the cassettes are automatically delivered and returned in sequence from the lowermost cassette, and, for example, the processing of transferring and writing data from a magnetic disc as described above is continuously carried out.

I claim:

1. A tape draw-out mechanism comprising a tape drawout member for engaging a tape in a cassette between a pair of reels and for drawing said tape out of said cassette into a recording-playback position and for returning said tape to said cassette, driving means for driving said tape draw-out member between an initial position in said cassette in engagement with said tape to a tape drawn-out position for recording-playback and for returning said tape to said cassette, said driving means including motor means and linkage means between said motor means and said tape draw-out member, said linkage means including means for returning said tape draw-out member to the initial position in said cassette from said tape recording-playback position in a time shorter than the time required for moving said tape from said position in said cassette to said recording-playback position.

2. A tape draw-out mechanism as set forth in claim 1, wherein said tape draw-out member comprises an arm having a tape roller on one end and a fulcrum on the other end, and said arm is turned with the fulcrum as the center of rotation by said driving means.

3. A tape draw-out machanism as set forth in claim 2, wherein two of said tape draw-out members are arranged so that movable ends of their arms confront each other, and at the time of rewinding the tape, one arm is returned to the initial position and the other arm is held at the tape drawn-out position.

4. A tape draw-out mechanism comprising a tape draw-out member to be engaged with a tape between a pair of reels and tape draw-out member driving means for reciprocating said tape draw-out member between the initial position and the tape drawn-out position and driving said tape draw-out member so that the return time required for returning said tape draw-out member to the initial position from the tape draw-out position is shorter than the time required for moving said tape draw-out member to the tape drawn-out position from the initial position, wherein draw-out and return of the tape are performed by the reciprocating movement of said tape draw-out member, said tape draw-out member comprising an arm having a tape engaging portion on one end and a fulcrum on the other end, said arm being turned with the fulcrum as the center of rotation by said driving means, said arm having a link groove, said driving means having a crank member having one end slidably engaged with said link groove and rotating with a shaft thereof as the center of rotation and a driving source for driving said crank member with said shaft as the center of rotation, and rotation of the driving source is converted to a swinging motion of said arm.

5. A tape draw-out mechanism as set forth in claim 4, wherein said tape engaging portion is a freely rotating roller.

6. A tape draw-out mechanism as set forth in claim 5, wherein at the initial position and the tape drawn-out position, a longitudinal direction of said link groove of the arm is orthogonal to a longitudinal direction of said crank member.

7. A tape draw-out mechanism as set forth in claim 6, wherein said crank member is arranged so that an angle of rotation required for drawing out said arm to the tape drawn-out position from the initial position is larger than an angle of rotation required for returning said arm to the initial position from the tape drawn-out position.

8. A tape draw-out mechanism as set forth in claim 7, wherein said crank member returns said arm to the initial position from the tape drawn-out position by rotating said arm in the same direction as the direction of rotation for moving said arm to the tape drawn-out position from the initial position.

9. A tape draw-out mechanism as set forth in claim 4, wherein a shape of said link groove in the vicinity of a position where the longitudinal direction of said link groove of said arm is orthogonal to the longitudinal direction of said crank member is arcuate along a circular locus of a top end portion of said crank member.

10. A tape draw-out mechanism as set forth in claim 4, wherein an elastic member is arranged on one side of said link groove of said arm.

11. A tape draw-out mechanism as set forth in claim 4, wherein two of said tape draw-out members are arranged so that the swinging ends of their arms confront each other, and at the time of rewinding the tape, one arm is returned to the initial position and the other arm is held at the drawn-position.

12. A tape draw-out mechanism as set forth in claim 4, wherein the tape is contained in a cassette.

13. A tape draw-out mechanism as set forth in claim 12, wherein a plurality of said cassettes are contained in a transportable magazine, and the tape draw-out mechanism is assembled in a cassette type magnetic tape device comprising a lift mechanism for vertically moving said magazine and a front loading mechanism for attaching said cassettes onto read/write means.

14. A tape draw-out mechanism as set forth in claim 13, wherein said cassette type magnetic tape device has an opening for attachment of said magazine, an openable and closable shutter is arranged on said opening, and said cassette type magnetic tape device comprises a push-out mechanism for pushing out a cassette at a position confronting an inlet of said front loading mechanism from said magazine and inserting said cassette into said inlet and a push-return mechanism for pushing and returning a used cassette which has returned to said inlet of said front loading mechanism after the read/write operation, into said magazine.

15. A tape draw-out mechanism as set forth in claim 14, wherein a plurality of said cassette type magnetic tape devices are arranged in parallel in a common frame, and a common power source and a common cooling fan for said magnetic tape devices are attached to said common frame.

* * * * *